United States Patent [19]

Maahs

[11] 3,800,123

[45] Mar. 26, 1974

[54] COOKING AND HOLDING OVEN

[75] Inventor: Jerry D. Maahs, Milwaukee, Wis.

[73] Assignee: M&M Enterprises, Inc., Milwaukee, Wis.

[22] Filed: Jan. 19, 1973

[21] Appl. No.: 324,958

[52] U.S. Cl. ............... 219/407, 219/386, 219/398, 219/413, 219/544, 99/328
[51] Int. Cl. .............................................. F27d 11/02
[58] Field of Search .......... 219/202, 386, 390, 398, 219/406, 407, 412, 413, 441, 442, 544; 99/325, 327, 328

[56] References Cited
UNITED STATES PATENTS

| | | | |
|---|---|---|---|
| 3,311,694 | 3/1967 | Lasch, Jr. | 219/407 X |
| 2,505,117 | 4/1950 | Hoffmann | 219/407 X |
| 3,004,130 | 10/1961 | Miller | 219/386 X |
| 3,155,814 | 11/1964 | Appleman et al. | 219/407 |
| 3,412,234 | 11/1968 | Otavka | 219/406 |
| 3,358,122 | 12/1967 | Torrey | 219/413 |
| 2,847,554 | 8/1958 | Huffman | 219/442 |
| 3,170,060 | 2/1965 | Oliver, Jr. et al. | 219/390 |
| 3,259,056 | 7/1966 | King | 99/325 |
| 3,364,338 | 1/1968 | Holtkamp | 219/398 |
| 3,521,030 | 7/1970 | Maahs | 219/202 |

Primary Examiner—Volodymyr Y. Mayewsky

[57] ABSTRACT

An improved cooking and holding electric oven is provided which has walls surrounded by one or more electric heating cables. Each cable is formed of electric resistance wire which is surrounded by insulation and appropriate metallic shielding. The oven is controlled by an electric circuit so that it is caused initially to enter a preset, relatively high temperature roasting or baking cycle, and then to drop automatically to a preset lower holding temperature after a preset time interval.

2 Claims, 4 Drawing Figures

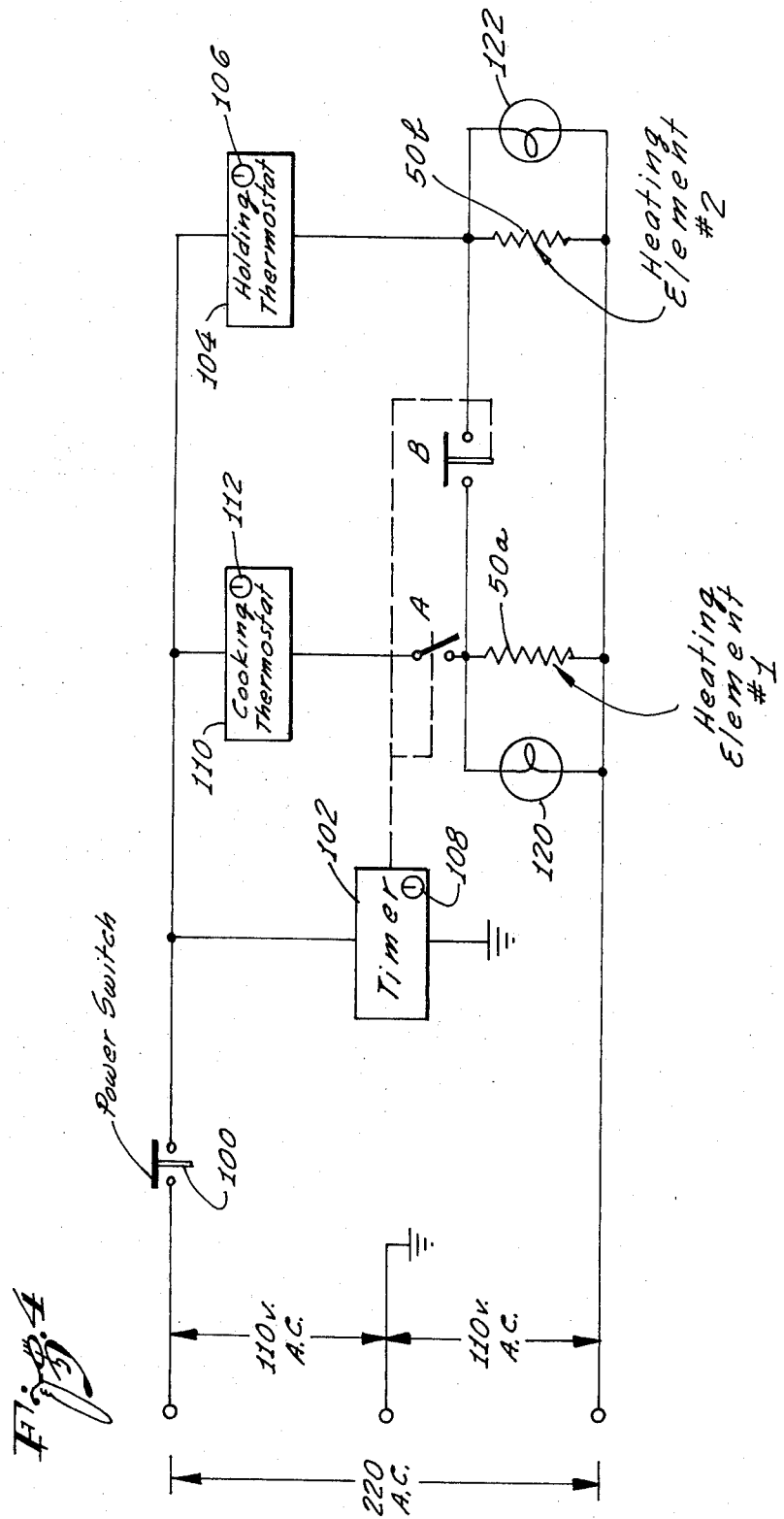

COOKING AND HOLDING OVEN

BACKGROUND OF THE INVENTION

The cooking and holding oven of the present invention is predicated on a similar heating principle and concept as the oven described and claimed in U.S. Pat. No. 3,521,030 which issued to the present inventor on July 21, 1970.

The oven assembly described in the patent, and the oven assembly of the present invention, includes one or more electric cables encased in the walls of the oven, and which extend around the interior compartment thereof. The cables may be of a commercially available type, such as are presently being manufactured by the Wire and Cable Division of General Electric. Such a cable is formed of electric resistance wire such as single conductor 20 gauge, Nichrome, 675 ohms per circular mil foot at 20°C. The conductor is surrounded by a 1/6 inches wall of asbestos insulation which, in turn is surrounded by a glass braid, and a monel metal shield which is electrically grounded.

The cooking and holding electric oven of the present invention includes an electric circuit for energizing the heating cables, and this circuit includes a timer unit which serves to reduce the current flow through the cables after a preset time interval so as to reduce the internal temperature of the oven from a cooking level to a holding level. As will be described, the cooking temperature and the holding temperature of the oven may be preset by the user, and the time of the cooking interval may also be preset.

The oven of the invention is versatile in that it can be manufactured in a variety of shapes and sizes. Moreover, it can be made to be stacked with other similar units. The oven of the invention may be mounted on rollers to be easily movable.

The oven of the invention does not emit fumes, odors or gases. Moreover, the oven is easy to clean.

An important feature of the oven of the invention is that when the roasting or baking cycle is completed, the oven automatically drops its internal temperature to a desired holding level which is preset by the user, so that there is no need to transfer the food to a holding warmer.

BRIEF DESCRIPTION OF THE DRAWINGS

FIG. 4 is an electric circuit diagram, partly in block form, of one embodiment of an electric energizing system for the oven.

DETAILED DESCRIPTION OF THE ILLUSTRATED EMBODIMENT

Figure 1:
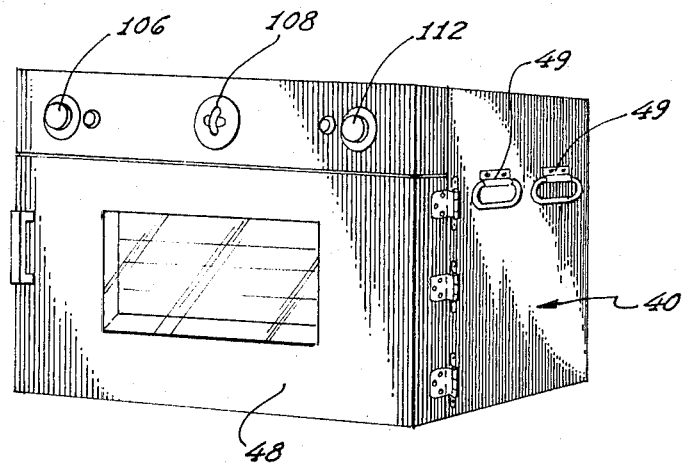
FIG. 1 is a perspective representation of an oven unit which may be constructed to incorporate the concepts of the invention.
Figure 2:
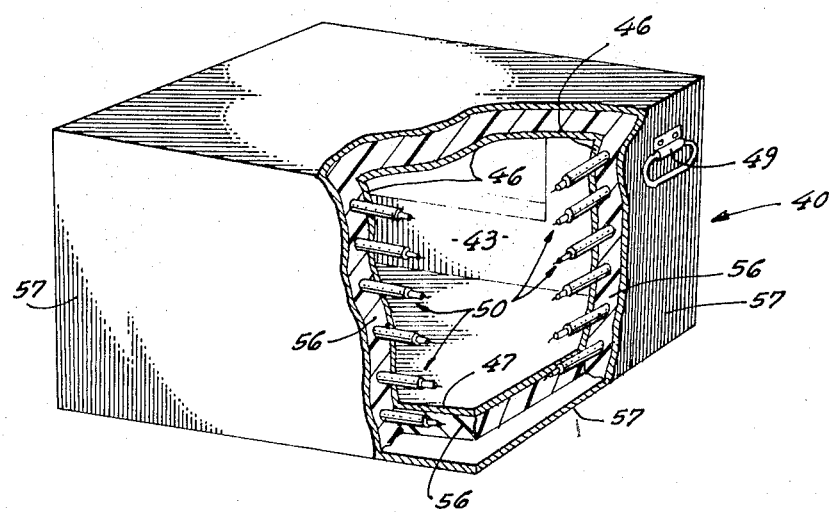
FIG. 2 is a further representation of the oven unit of FIG. 1, partially broken away to reveal the electric heating cables and other internal components of the oven.

The illustrated oven unit of FIGS. 1 and 2 is designated generally as 40 and, in the illustrated embodiment, it has a rectangular configuration. Within the oven 40 is a food compartment 43 formed of inside shell walls 46, a wall floor 47, and a hinged door 48. The door 48 may have a transparent section, as shown in FIG. 1, so as to reveal the food compartment 43 of the oven. The oven is also equipped with handles, such as the handles 49 to permit the user to move the oven unit from place to place, when so desired. As mentioned above, the oven unit may be mounted on appropriate rollers to facilitate its portability.

An electric heating cable 50 is wrapped around the walls 46 of the oven unit, and under the floor 47, if so desired; the cable 50 being located so as to provide a desired uniform heat in the oven compartment 43. As represented in FIG. 4, the cable 50 may actually comprise two independent sections 50a and 50b each of which is looped from top to bottom around the upright walls 46 at regular intervals.

Figure 3:
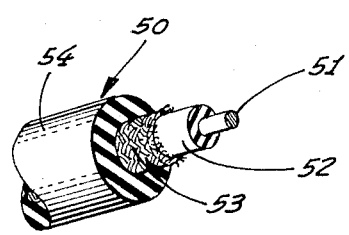
FIG. 3 is a cut-away view of a piece of electric cable of the type which may be used to constitute the electric heating elements of the oven of FIG. 1 and 2.

Details of the cable 50 are shown in FIG. 3. As mentioned above, the cable may be of the type presently being manufactured by the Wire and Cable Division of the General Electric Company. The General Electric cable includes an internal resistance wire, an asbestos sheath surrounding, protecting and insulating the wire, a glass braid for strength and, finally, an outer monel metal jacket which is electrically grounded. This type of cable has many advantages, which include a long maintenance-free life which is important due to the relative inaccessibility location of the cable in the structure of the invention. The cable also has an unusually high mechanical strength. Alternatively, the cable may have the construction shown in FIG. 3, such as described in Maahs U.S. Pat. No. 3,521,030, and it may include a resistance wire 51, a silicone rubber sheath surrounding, protecting and insulating the wire 51, a metallic braid 53 for strength and grounding purposes, and finally an outer silicone rubber jacket 54.

The construction of the oven 40 may be completed by insulation 56 which, as described in the aforesaid Maahs patent, can be fiberglass sheets placed around the walls 46, wall floor 47 and cable 50 within the compartment 43. The top will also include insulation, as shown in FIG. 2. Outer shell 57 encloses the oven and provides necessary protection as also shown in FIG. 2.

As shown in FIG. 4, the electric cable sections 50a and 50b are included in an energizing circuit which is preferably connected to an appropriate 220-volt alternating-current source. A power switch 100 is actuated by the user to energize the oven. When the switch 100 is actuated a timer unit 102, connected as shown is activated. Also, the electric cable section 50b is energized through a holding thermostat 104. The holding thermostat 104 is equipped with a manually settable control 106, and the timer 102 is equipped with a manually settable control 108.

The circuit also includes a cooking thermostat 110 which is equipped with a manually settable control 112. The timer includes a pair of switches designated A and B. When the power switch 100 is first actuated, the switches A and B are closed, so that both the electric cable section 50a and 50b are connected through the cooking thermostat 110 across the energizing circuit. Since the cooking thermostat 110 is set to a higher temperature by the control 112, the holding thermostat 104 is ineffective during the cooking cycle.

The length of the cooking cycle is established by the user setting the control 108 of the timer 102. At the end of the cooking cycle, the timer 102 opens the switches A and B, so as to remove the cooking thermostat 110 and the cable section 50a from the circuit. The cable section 50b remains in the circuit, and now is controlled at a lower temperature by the holding thermostat 104. Indicator lights 120 and 122 are respectively connected across the cable sections 50a and 50b. Each of these cable sections may represent, for example, a 1,500 watt heater element No. 1, and the cable section 50b is designated as heater element No. 2.

The invention provides, therfore, an improved cooking and holding oven which is simple in its construction, and which is easy to control. The oven of the invention operates in an improved manner to cook foods, and then it automatically holds the foods at a reduced temperature.

While a particular embodiment of the invention has been shown and described, modifications may be made. It is intended in the following claims to cover the modifications which come within the spirit and scope of the invention.

What is claimed is:

1. A cooking and holding oven comprising inner and outer spaced wall members and a door forming an internal compartment, first and second heating electric cable means interposed between said inner and outer wall members, heat insulation means encasing said first and second cable means and interposed between said inner and outer wall members to support said first and second cable means and to maintain heat developed by said first and second cable means in said internal compartment; and an electric circuit for supplying exciting electric current to said first and second cable means, including first and second thermostat control units mounted in said oven and individually manually adjustable from the outside of the oven; first electric conductor means connecting said first thermostat control unit directly to said first cable means; and second electric conductor means including a timer unit mounted on said oven and manually adjustable from outside the oven for selectively connecting said second thermostat control unit to said second cable means.

2. The cooking and holding oven defined in claim 1, in which said timer also selectively connects said first electric cable to said second thermostat control unit.

* * * * *